March 14, 1944. L. M. CHRISTENSEN 2,344,025
FERMENTATIVE PRODUCTION OF 2, 3 BUTYLENE GLYCOL
Filed March 12, 1941 2 Sheets-Sheet 2
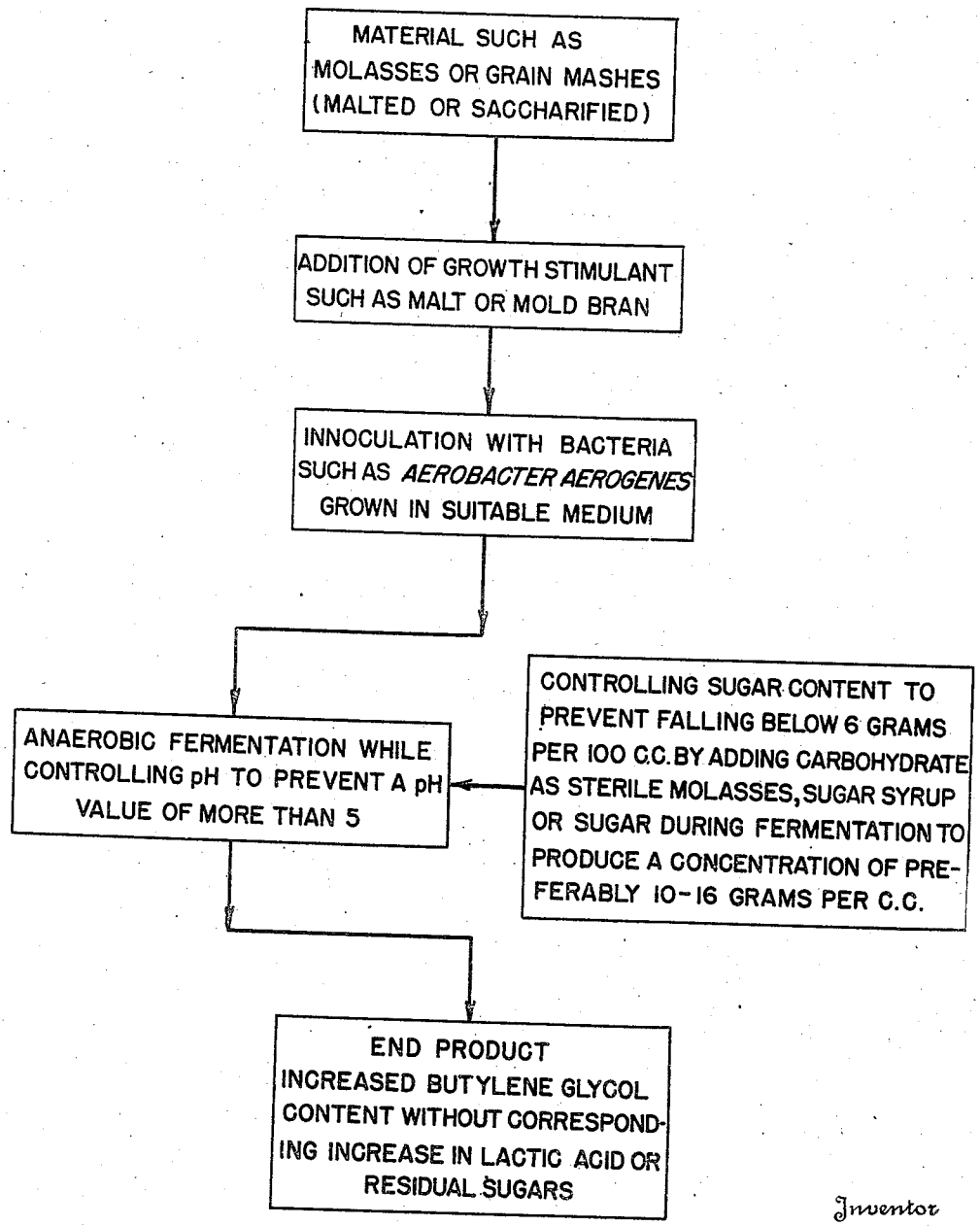

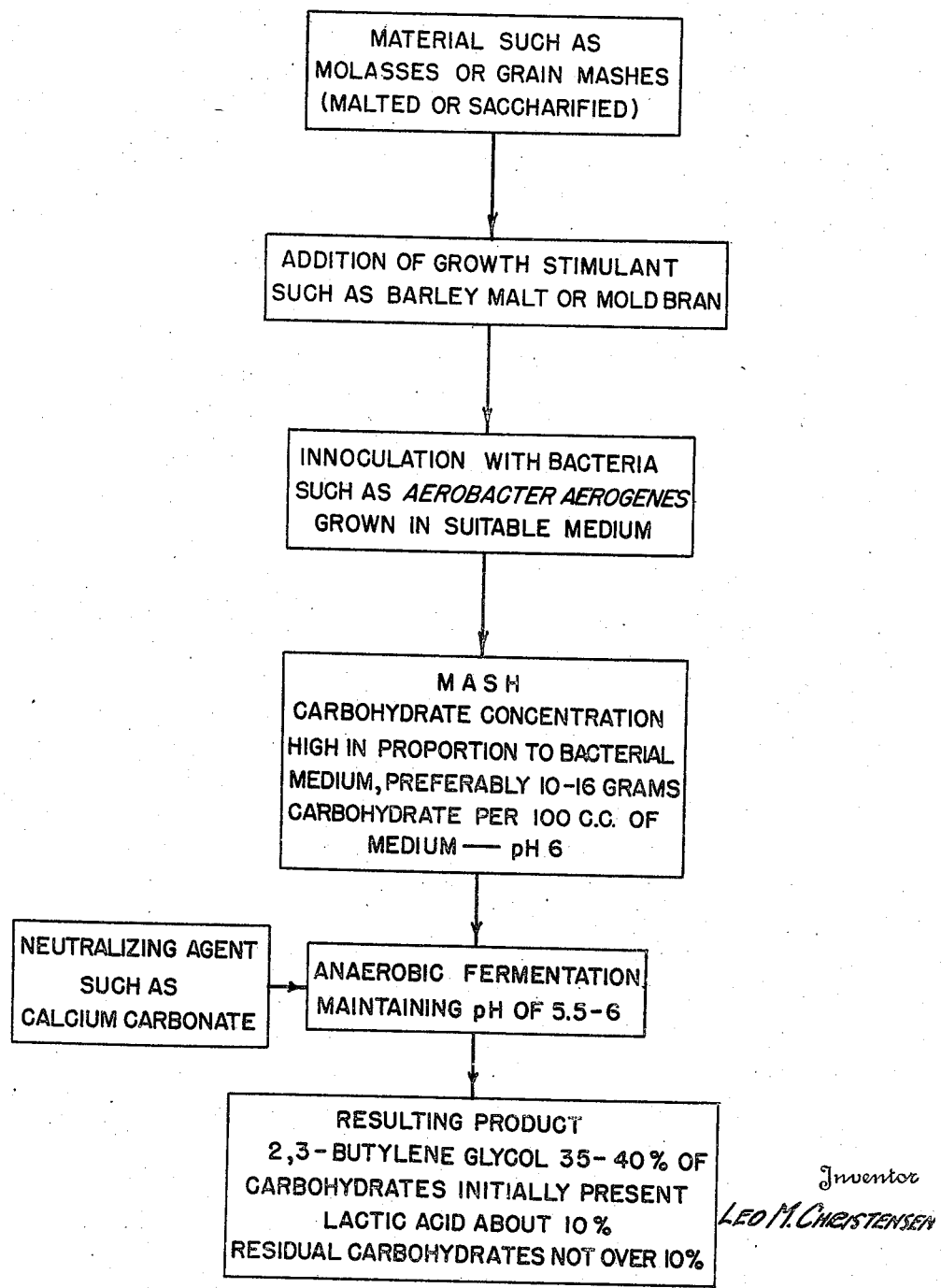

Patented Mar. 14, 1944

2,344,025

UNITED STATES PATENT OFFICE 2,344,025

FERMENTATIVE PRODUCTION OF 2,3-BUTYLENE GLYCOL

Leo M. Christensen, Moscow, Idaho, assignor to National Agrol Company, Inc., New York, N. Y., a corporation of Delaware Application March 12, 1941, Serial No. 383,051

5 Claims. (Cl. 195—43)

This invention relates generally to a process for producing 2,3-butylene glycol by the fermentation of carbohydrates, and more especially to a process of fermenting carbohydrates in which an increased yield of 2,3-butylene glycol is obtained and the proportionate yield of lactic acid is reduced by employing a starting material having a high concentration of carbohydrates in proportion to the bacterial culture, maintaining this concentration, and controlling the hydrogen ion concentration of the fermenting mash.

Hitherto, it has been well known that species of the genus Aerobacter produce lactic acid and either acetyl methyl carbinol or 2,3-butylene glycol from a wide variety of carbohydrates. It has been found that when this fermentation is carried out under aerobic conditions, acetyl methyl carbinol, lactic acid, carbon dioxide and hydrogen are produced, while under anaerobic conditions 2,3-butylene glycol is formed in place of acetyl methyl carbinol and proportionately less hydrogen is liberated.

Ordinarily, a material containing a sugar is selected for these fermentations, and formerly it has been thought to be necessary to use rather dilute sugar solutions containing approximately 2 to 4% of sugar. Under these conditions, the yields of lactic acid and glycol are nearly equal. Of course, the presence of such large amounts of lactic acid interferes with the recovery of the glycol.

Also, in order to substantially utilize even these small amounts of sugar, it was found necessary to neutralize the lactic acid formed in order to prevent the development of a detrimental hydrogen ion concentration. Ordinarily this is accomplished, as set forth in U. S. Patent 1,899,156 to A. J. Kluyver and M. A. Scheffer, by the addition of calcium carbonate to the mash. Normally the hydrogen ion concentration of such a fermentation is within the range of pH 5 to pH 7.

Obviously such fermentations have always been slow and incomplete, usually ten to twenty days being required to complete the process. Moreover, not more than 80% of the sugar is converted and the residual sugar greatly interferes with the recovery of the glycol.

Many attempts have been made to correct these conditions, but, as far as applicant is informed, without success. These failures are of especial importance at the present time due to the demand for butadiene to be used in the production of synthetic rubber.

One of the objects of this invention is to avoid the above-mentioned disadvantages of the prior art.

Another object is to provide a method of obtaining 2,3-butylene glycol by the fermentation of carbohydrates in which the starting mash contains a high concentration of the carbohydrates.

Another object of this invention is to provide a method for obtaining 2,3-butylene glycol by the fermentation of carbohydrates in which a maximum yield of glycol and a proportionately small amount of lactic acid and a high utilization of the carbohydrates is obtained.

Still another object of this invention is to provide a method of obtaining 2,3-butylene glycol by the fermentation of carbohydrates in which the hydrogen ion concentration of the mash is controlled during the fermentation period.

A further object of the present invention is to provide a method of controlling the concentration of carbohydrates as well as the hydrogen ion concentration during the fermentation of the carbohydrates contained in the starting material.

With these and other objects in view, this invention embraces broadly the concept of providing a novel method of obtaining 2,3-butylene glycol by employing a starting material containing a high concentration of the selected carbohydrate in proportion to the bacterial culture, maintaining this concentration, and controlling the hydrogen ion concentration at not more than pH 5 by careful neutralization at frequent intervals of the lactic and other acids formed during the fermentation. This use of a high concentration of carbohydrate and the subsequent pH control increases the yield of glycol, causes a high proportion of the carbohydrates to be utilized, and reduces the proportionate yield of lactic acid. As previously mentioned, these latter two conditions are desirable as the presence of lactic acid and residual carbohydrates interferes with the recovery of the glycol.

In this connection it should be noted that while I prefer to use Aerobacter aerogenes in the fermentation, it is to be understood that any of the 2,3-butylene glycol producing bacteria may be employed, and it is desirable to select a culture showing a high fermentation rate and other desirable characteristics.

In preparing the bacterial culture a suitable culture of bacteria is isolated from the soil or other sources and may be carried on broth or peptone agar slants in the usual manner, building the inoculum for large scale fermentations in liquid media, or, if desired, the culture may be continually cultivated in liquid media, preferably transferring every four days.

Satisfactory liquid media may be made with cane or beet molasses or with malted grains, preferably with the addition of malt or other source of growth stimulants as will be subsequently described. The media must be suitably sterilized before use and the inoculation ratio is preferably one part of inoculum to ten to twenty parts of culture. The optimum temperature of the bacteria is about 37° C. In the preferred process the culture is cultivated in molasses media, malted grain mashes or in grain mashes saccharified with malt bran or with dilute acid. To provide for the proficiency in growth stimulants, malt, mold bran, or the like, is added. Ordinarily 0.1 to 1.0 gram of barley malt or mold bran per 100 cubic centimeters of mash is added. Usually the added molasses and grains contain sufficient amounts of phosphates, other inorganic nutrients and nitrogenous materials to satisfy the requirements of the bacteria.

A wide variety of carbohydrates including starch, dextrins, sucrose, maltose, lactose, levulose, xylose, arabinose, galactose, dextrose and others may be employed in the process but it is preferred to use sugars rather than starch or dextrins because of the lower mash viscosity of the sugars.

The drawings disclose two forms of the process.

In practicing the invention disclosed in Figure 1, a starting material containing the desired carbohydrate is selected. For example, molasses containing sugar may be selected. An important feature of the process is the discovery that the sugar concentration is a highly important factor in determining the course of the fermentation. In this connection it has been discovered that sugar concentrates as high as 27 grams per 100 cubic centimeters of bacterial culture may be employed, but preferably the concentration is within the range of from 10 to 16 grams per 100 cubic centimeters.

In this connection it should be noted that when this mash is fermented, the sugar concentration decreases rapidly during the first 48 to 60 hours, or until the concentration has been reduced to from 4 to 6 grams per 100 cubic centimeters. During this period the formation of lactic acid or of other acids is practically negligible and the hydrogen ion concentration, which at the start of fermentation was about pH 6, remains substantially unchanged. At this point, however, the fermentation suddenly changes, as evidenced by the marked reduction in the production of carbon dioxide and hydrogen, and it has been found that as soon as the sugar concentrations fall below 5 grams per 100 cubic centimeters, the culture produces lactic acid as well as glycol and the proportion of lactic acid to glycol increases as the sugar concentration decreases.

For the above reason, another important feature of the process in addition to the employment of high sugar concentrations is to carefully maintain the hydrogen ion concentration in a range from pH 5.5 to pH 6.0 by the addition of a neutralizing compound such as calcium carbonate. In this manner it is possible to continue active fermentation and thereby to substantially complete utilization of the sugars. This control must be maintained by careful adjustment of the pH at frequent intervals. In this connection, it should be remembered that if the hydrogen ion concentration falls below pH 5.0, the bacteria are killed, and if it exceeds pH 7.0 the proportion of lactic acid increases greatly.

From the above description it is believed obvious that the concentration of sugar used in the starting mash and the control of the hydrogen ion concentration are important factors in increasing the utilization of the sugar, reducing the amount of residual sugar, increasing the percentage of glycol produced and reducing the amount of lactic acid in proportion to that of the glycol. It has been found that if this process is followed it is possible to utilize more than 90% of the sugar, to obtain glycol to the extent of 35–40% of the sugars initially present and to reduce the yield of lactic acid to approximately 10%. The reduction of the amount of residual sugar present and the smaller proportionate amount of lactic acid produced enables the glycol to be obtained without interference.

The glycol may be recovered by extraction with any of a number of water immiscible solvents, such as, ethyl ether, or can be removed by distillation, preferably under reduced pressure. The yield of glycol is 35 to 40% of the sugar charged to the process.

Figure 2 of the drawings discloses a method of producing 2,3-butylene glycol by the fermentation of molasses in which the high concentration of sugar in proportion to the bacterial medium as well as the hydrogen ion concentration is controlled during the process. This control of the sugar concentration markedly reduces the proportion of lactic acid to glycol formed in this process.

In this process the proportion of sugar concentrates to bacterial culture employed may be as high as 27 grams of sugar per 100 cubic centimeters of bacterial culture, but preferably the concentration is within the range of from 10 to 16 grams per 100 cubic centimeters of culture. During the fermentation of this mash the sugar concentration decreases rapidly for the first 48 to 60 hours, or until the concentration of sugars has been reduced to 6 grams per 100 cubic centimeters of medium. During this period the formation of lactic acids and other acids is practically negligible and the hydrogen ion concentration which at the start of the fermentation was about pH 6 remains substantially unchanged. However, at this point, as evidenced in the marked reduction in the production of carbon dioxide and hydrogen, the fermentation suddenly changes and as the sugar concentrations fall below 5 grams per 100 cubic centimeters, the culture produces lactic acid as well as glycol and the proportion of lactic acid to glycol increases as the sugar concentration decreases.

However, at this point in the process, or preferably before this point is reached, sterile molasses, sugar syrup or sugar is added to return the concentration to from 10 to 16 grams of total sugars per 100 cubic centimeters of culture. At the same time, the hydrogen ion concentration is controlled, if necessary, by adding neutralizing substances such as calcium carbonate so as to prevent the mixture reaching a pH above 5.0. By this means the production of lactic and other acids is prevented.

It is sometimes possible to repeat this reinforcement several times, and of course it is preferable to add small quantities of sugar at more frequent intervals if feasible. Moreover, it is usually desirable to add a quantity of the nutrients and growth stimulants previously described with these sugar additions in about the same proportions that they were employed in the first mash.

By following the above procedure, the glycol concentration is markedly increased without a proportionate increase in the amount of lactic acids or residual sugars. This not only improves the yield of butylene glycol, but also serves to reduce the interference in the glycol recovery due to impurities.

The following example illustrates in detail one means of practicing this process.

*Example*

300 grams of beet molasses containing 165 grams of total sugars, and 5 grams of mold bran, were diluted with water to 1500 cubic centimeters and sterilized in the autoclave one hour at 110° C. The medium was then cooled to 37° C. and inoculated with 100 cubic centimeters of a 24 hour old culture of *Aerobacter aerogenes* in a medium of the same composition, and the flask was incubated at 37° C. The hydrogen ion concentration was pH 6.6.

After 12 hours of fermentation it was found that the pH had dropped to 5.9 and that 52 grams of sugars had been fermented. 200 grams of sterile molasses containing 110 grams of sugars were then added, resulting in a sugar concentration of 13.3 grams per 100 cubic centimeters. At the end of 24 hours of fermentation the pH was 5.80 and there were 126 grams of sugars remaining. 250 grams of sterile molasses containing 137.5 grams of total sugars were added, producing a sugar concentration of 13.7 grams per 100 cubic centimeters. At the end of 48 hours of fermentation the pH was 5.48 and 140 grams of sugars remained.

During the next 48 hours of fermentation the hydrogen ion concentration was maintained within the range of pH 5.5 to pH 6.0 by periodic additions of sodium carbonate in carefully controlled amounts. After 96 hours of fermentation there were 28 grams of sugar remaining. The yield of 2,3-butylene glycol was 37.0 percent of the sugar charged to process, and the yield of lactic acid was 16.4 percent. The glycol was recovered by evaporating the medium to about one third its original volume and then extracting the glycol with ethyl ether. The ether extract was then fractionally distilled, the glycol distilling at 184° C. at atmospheric pressure.

While for purposes of illustration the processes have been described in connection with the use of a sugar, it is apparent that other carbohydrates could be substituted without departing from the spirit of the invention and that other bacterial media and growth stimulants can be employed. It is therefore to be understood that this invention is to be limited only by the scope of the appended claims.

I claim:

1. A method of fermenting carbohydrates to produce 2,3 butylene glycol comprising inoculating a material containing fermentable carbohydrates with a culture of a 2,3 butylene glycol producing bacteria of the genus Aerobacter, in the proportions of at least 10 grams of carbohydrates to 100 cubic centimeters of bacterial culture, anaerobically fermenting the resulting mash, controlling the carbohydrate concentration to prevent the concentration from falling below 6 grams per 100 cubic centimeters of bacterial culture by introducing additional fermentable carbohydrates to the mixture at required intervals during the fermentation and, adding calcium carbonate to neutralize the acid formed during the fermentation, and control the hydrogen ion concentration at a pH of less than 5.

2. A method of fermenting carbohydrates to produce 2,3 butylene glycol comprising inoculating a material containing fermentable carbohydrates with a culture of a 2,3 butylene glycol producing bacteria of the genus Aerobacter, in the proportions of at least 10 to 16 grams of carbohydrates to 100 cubic centimeters of bacterial culture, anaerobically fermenting the resulting mash, controlling the carbohydrate concentration to prevent the concentration from falling below 6 grams per 100 cubic centimeters of bacterial culture by introducing additional carbohydrates to the mixture at required intervals during the fermentation and, adding a neutralizing inorganic mixture to neutralize the acid formed during the fermentation, and control the hydrogen ion concentration at a pH of less than 5.

3. A method of fermenting carbohydrates to produce 2,3 butylene glycol comprising inoculating a material containing fermentable carbohydrates with a culture of 2,3 butylene glycol producing bacteria of the genus Aerobacter, in the proportions of at least ten grams of carbohydrates to 100 cubic centimeters of bacterial culture, anaerobically fermenting the resulting mash and maintaining a pH of from 5.5 to 6 during the said fermentation by the addition of an inorganic neutralizing agent when necessary, to neutralize any acid formed during the fermentation.

4. A method of fermenting carbohydrates to produce 2,3 butylene glycol comprising inoculating a material containing fermentable carbohydrates with a culture of a 2,3 butylene glycol producing bacteria of the genus Aerobacter, in the proportions of from 10 to 27 grams of carbohydrates to 100 cubic centimeters of bacterial culture, anaerobically fermenting the resulting mash and maintaining a pH of from 5.5 to 6 during said fermentation by the addition of calcium carbonate when necessary, to neutralize any acid formed during the fermentation.

5. A method of fermenting carbohydrates to produce 2,3 butylene glycol comprising inoculating a mixture containing fermentable carbohydrates with a culture of a 2,3 butylene glycol producing bacteria of the genus Aerobacter, in the proportions of at least ten grams of carbohydrates to 100 cubic centimeters of bacterial culture, anaerobically fermenting the resulting mash and retarding the formation of acid by maintaining a carbohydrate concentration of at least six grams per 100 cubic centimeters of culture by introducing additional fermentable carbohydrates to the mixture when required in order to maintain a pH value of at least 5.

LEO M. CHISTENSEN.